United States Patent
Pharn (10) Patent No.: US 7,584,289 B2
(45) Date of Patent: Sep. 1, 2009

(54) SYSTEM AND METHOD TO EFFICIENTLY BROADCAST TELEVISION VIDEO AND AUDIO STREAMS THROUGH THE INTERNET FROM A SOURCE IN SINGLE LEADING TIME ZONE TO MULTIPLE DESTINATIONS IN LAGGING TIME ZONES

(75) Inventor: Art Pharn, Huntington Beach, CA (US)

(73) Assignee: ABroadcasting Company, Huntington Beach, CA (US)

(*) Notice: Subject to any disclaimer, the term of this patent is extended or adjusted under 35 U.S.C. 154(b) by 437 days.

(21) Appl. No.: 11/486,603

(22) Filed: Jul. 14, 2006

(65) Prior Publication Data

US 2008/0016247 A1    Jan. 17, 2008

(51) Int. Cl.
*G06F 15/16* (2006.01)
(52) U.S. Cl. .............. 709/230; 709/232; 709/233; 709/248
(58) Field of Classification Search .............. None
See application file for complete search history.

(56) References Cited

U.S. PATENT DOCUMENTS

| | | | |
|---|---|---|---|
| 6,239,793 B1* | 5/2001 | Barnert et al. | 715/201 |
| 6,401,243 B1* | 6/2002 | Suzuki | 725/86 |
| 6,792,470 B2* | 9/2004 | Hakenberg et al. | 709/232 |
| 7,076,563 B1* | 7/2006 | Yamanaka et al. | 709/233 |
| 7,240,099 B2* | 7/2007 | Miyazaki et al. | 709/213 |
| 2002/0111855 A1* | 8/2002 | Hammerstad | 705/14 |
| 2003/0084108 A1* | 5/2003 | Syed | 709/206 |
| 2004/0127166 A1* | 7/2004 | Oshima | 455/74 |
| 2005/0249175 A1* | 11/2005 | Nasu et al. | 370/338 |
| 2007/0124494 A1* | 5/2007 | Harris | 709/233 |

* cited by examiner

*Primary Examiner*—Dohm Chankong
*Assistant Examiner*—Angela Widhalm
(74) *Attorney, Agent, or Firm*—Blakely, Sokoloff, Taylor & Zafman LLP.

(57) ABSTRACT

According to one embodiment of the invention, a method for improving video quality by leveraging time zone delays occurring during transmissions of programs. The method comprises an operation of determining a time zone delay between a broadcasting source of a program and a targeted destination for the program. Thereafter, the program is transmitted to the targeted destination where the resolution is equal to at least twice of a normal resolution and/or transmission data rate is equal to no more than one-half of a normal transmission data rate.

7 Claims, 10 Drawing Sheets

Lagging Time Zone with Peer-to-Peer network

Fig. 1 Video on demand network

Fig. 2 Peer-to-peer network

Fig. 3 Lagging Time Zone with Peer-to-Peer network

FIG. 4 - EXEMPLARY IPTV NETWORK

FIG. 5 - 1-to1 or Unicast communication

FIG. 6 - 1-to-N communication

FIG. 7 - P2P communication

FIG. 8 – Program content selection

FIG 9. Duplicate server of major 1-to-N network

FIG 10. Processing Flow chart

SYSTEM AND METHOD TO EFFICIENTLY BROADCAST TELEVISION VIDEO AND AUDIO STREAMS THROUGH THE INTERNET FROM A SOURCE IN SINGLE LEADING TIME ZONE TO MULTIPLE DESTINATIONS IN LAGGING TIME ZONES

FIELD

Embodiments of the present invention generally relate to Internet Protocol Television (IPTV), and particularly to a system and method to efficiently broadcast television video and audio streams through the Internet from a broadcasting source in a leading time zone to multiple broadcast destinations in lagging time zones.

GENERAL BACKGROUND

Video over Internet Protocol (IP) is a network-based one-way transmission of video content. The video is broadcast from a broadcasting source in a Unicast or Multicast configuration. In a Unicast configuration, the transmission is replicated by the broadcasting source for each targeted client (or viewer). In a Multicast configuration, however, the same signal is sent over the network as one transmission, but to multiple clients or a group of clients.

Currently, video over IP is used for many applications. For instance, using Motion Picture Experts Group (MPEG) compression, video over IP has been used for years in network applications such as video on demand.

Over the last few years, there has been interest in live video broadcasting over IP, which is different from other types of communications on the Internet. For example, live video broadcasting (or streaming) is one-way communication instead of two-way communication where every client receives the same data at the same time instead of at different times. Hence, under current communication systems, video over IP requires a large bandwidth to support transmissions, and for certain types of video over IP applications, such as Internet Television (IPTV) for example, demand for better video resolution, from SDTV to HDTV, requires even higher bandwidth, especially at the servers. The bandwidth requirement at the servers is generally a direct proportion of the numbers of clients.

Figure 1:
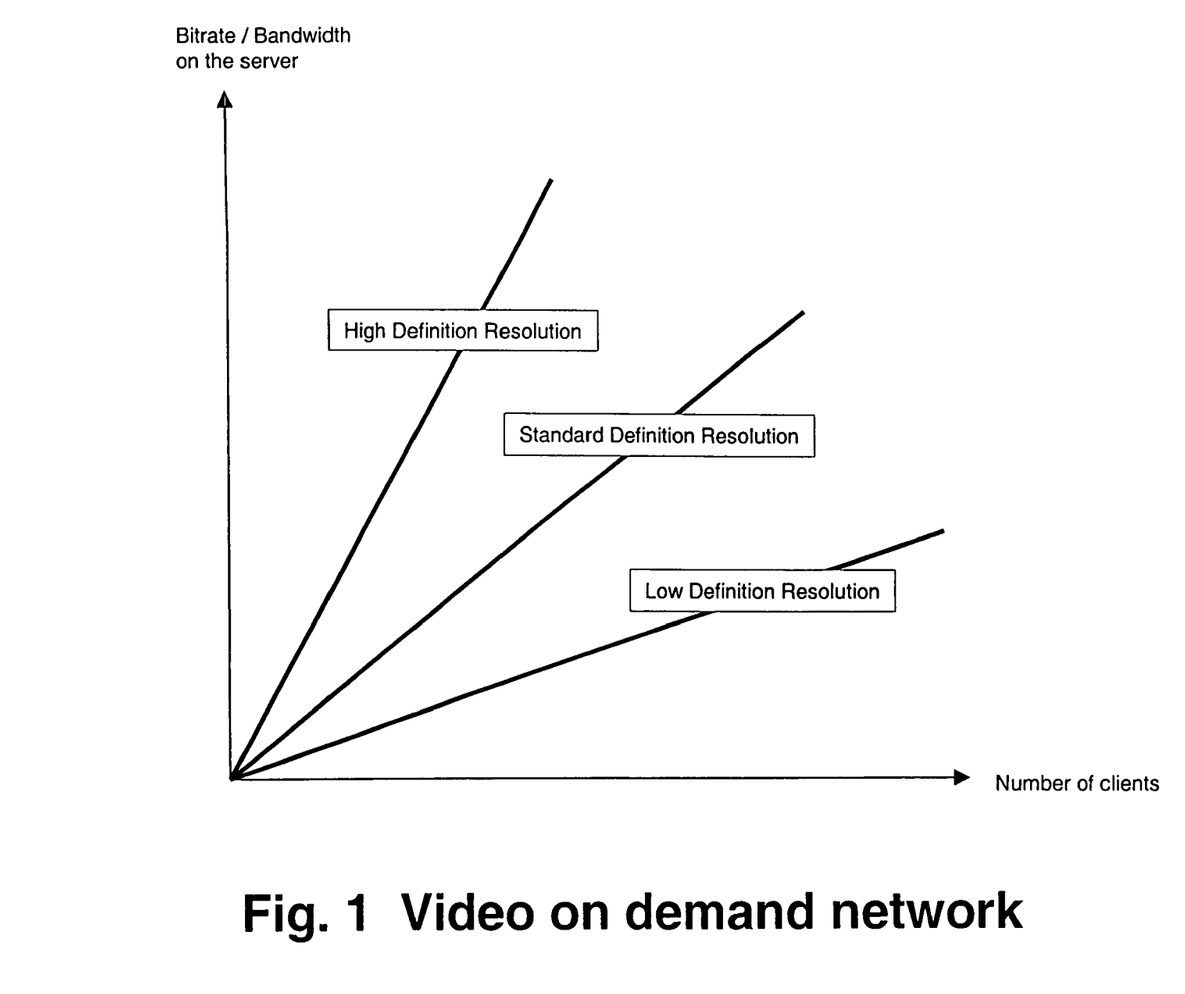
FIG. 1 is an exemplary graph of the bit rate and bandwidth server requirements.

FIG. 1 shows an exemplary graph of the bit rate and bandwidth of a server requirement for high, standard and low definition resolutions. As the number of clients or viewers increased, the larger bitrate and bandwidth is needed. In addition, better resolution means higher bitrate and higher bandwidth. If the number of client is allowed to become too large, not one but all of clients will suffer poor video and audio qualities. Bitrate and bandwidth have become one of the most critical aspects for good Quality of Service. In this solution, the Quality of Service will break down when the number of clients grown too large.

Figure 2:
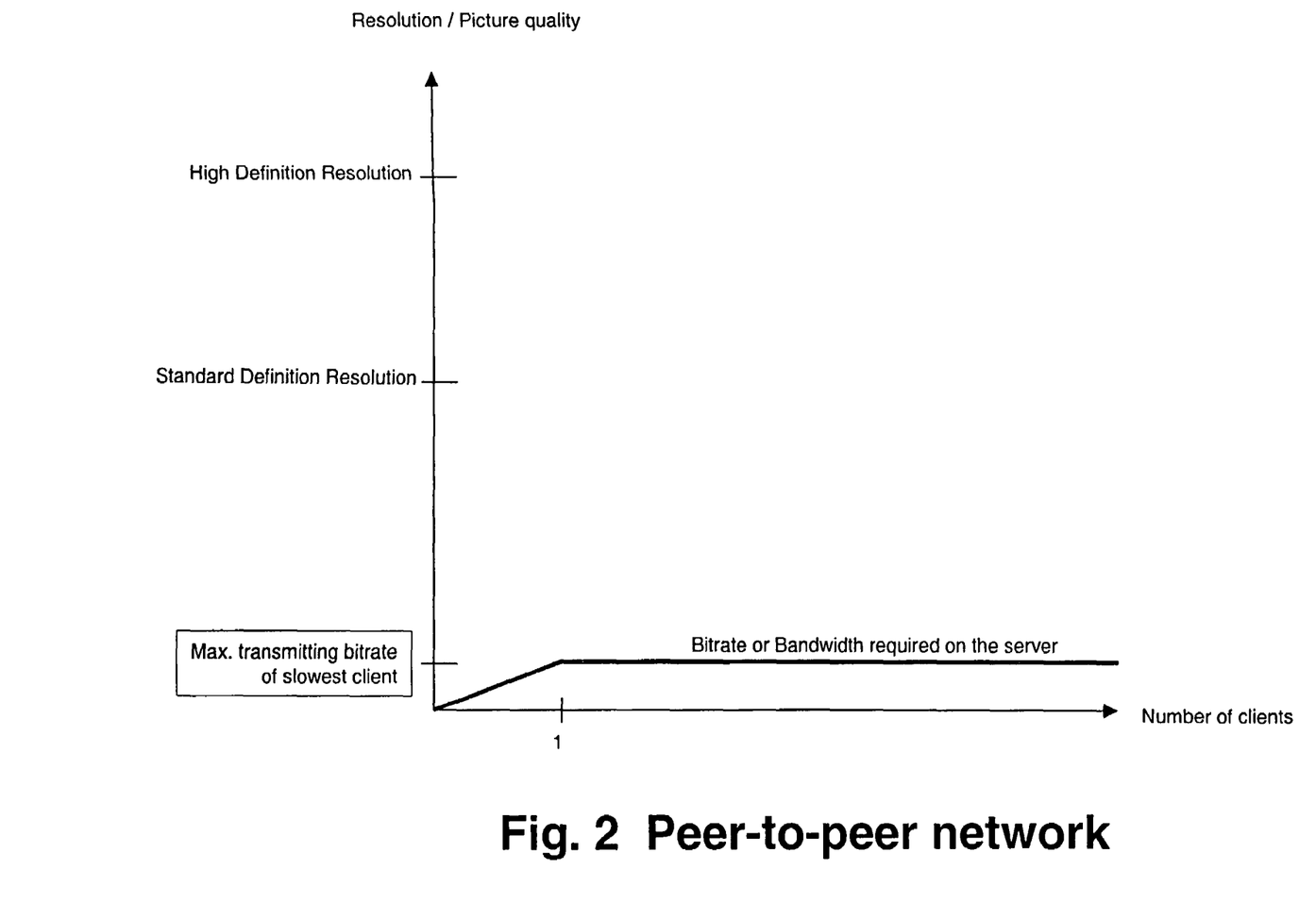
FIG. 2 is an exemplary graph of bit rate and bandwidth requirements for a Peer-to-Peer network.

FIG. 2 illustrates one alternative solution using Peer-to-Peer network where the bitrate and bandwidth required is distributed among the clients instead of concentration at the server. Each client is required to relay the video that it received to the next client. Therefore, the number of clients can grow unlimited. However, this solution has one limitation. The bitrate of the entire network depends upon the weakest or slowest client. For this reason, the peer-to-peer network is to slow for high-resolution videos.

BRIEF DESCRIPTION OF THE DRAWINGS

The invention may best be understood by referring to the following description and accompanying drawings that are used to illustrate embodiments of the invention.

DETAILED DESCRIPTION

Figure 3:
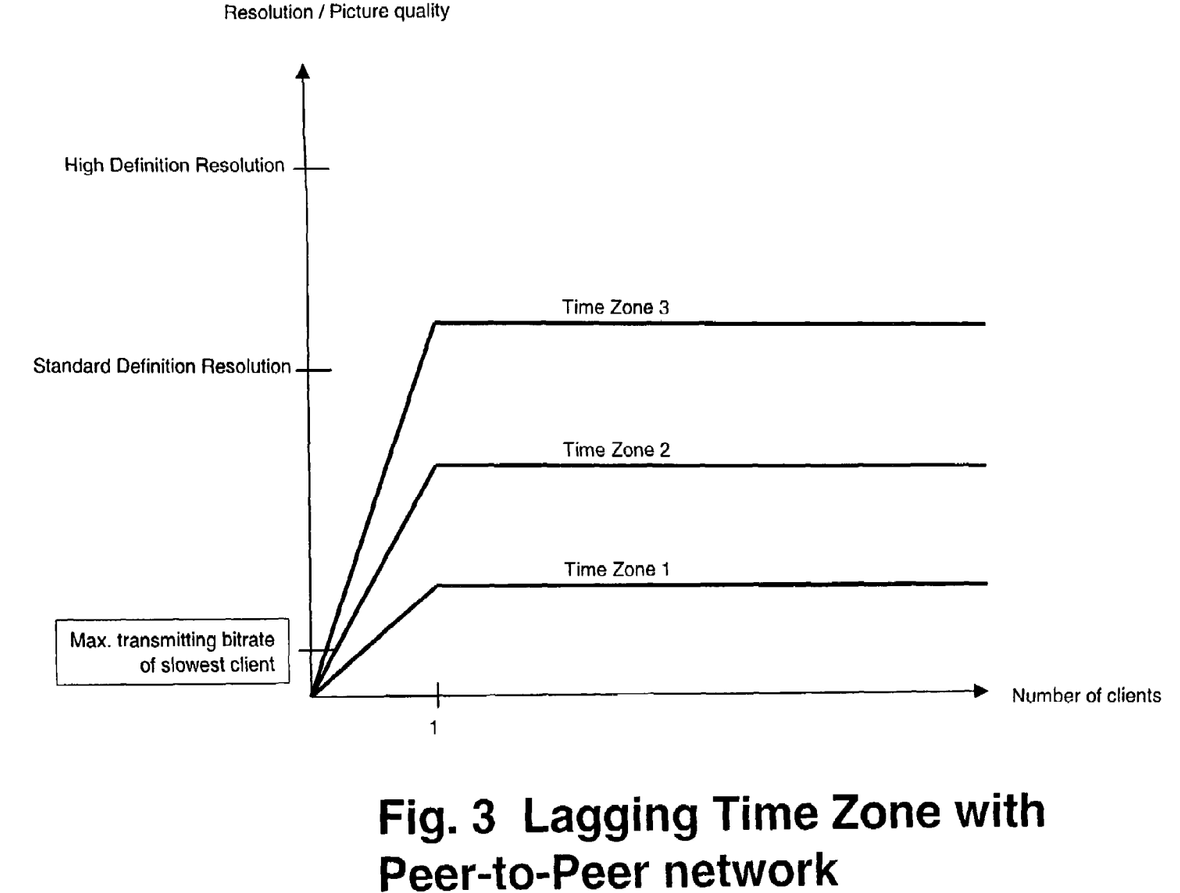
FIG. 3 is an exemplary graph of bit rate and bandwidth requirements for a Peer-to-Peer network for lagging time zones in accordance with an embodiment of the invention.

In general, according to one embodiment of the invention, broadcast television video and audio streams are efficiently transferred through the Internet from a broadcasting source in a leading time zone to multiple broadcast destinations in lagging time zones. For instance, as shown in FIG. 3, by taking advantage of different time zones and recurring commercials, the peer-to-peer network can support higher resolution videos than it normally could.

More specifically, this invention involves a system and method for enabling the transmission of television video and audio streams where the broadcasting source is in a leading time zone and the multiple broadcast destinations are in lagging time zones. The leading time zone is significantly ahead in time than the lagging time zones such as greater than twelve hours ahead in time.

In one embodiment, this invention involves a system and method to reduce transmitting bandwidth by removing duplicate or repeating videos.

In an alternative embodiment, this invention works in a different network broadcasting infrastructures (such as Unicast and Multicast), and has the capability of examining the network infrastructure of each broadcast client destination to optimize transmission rate.

Figure 4:
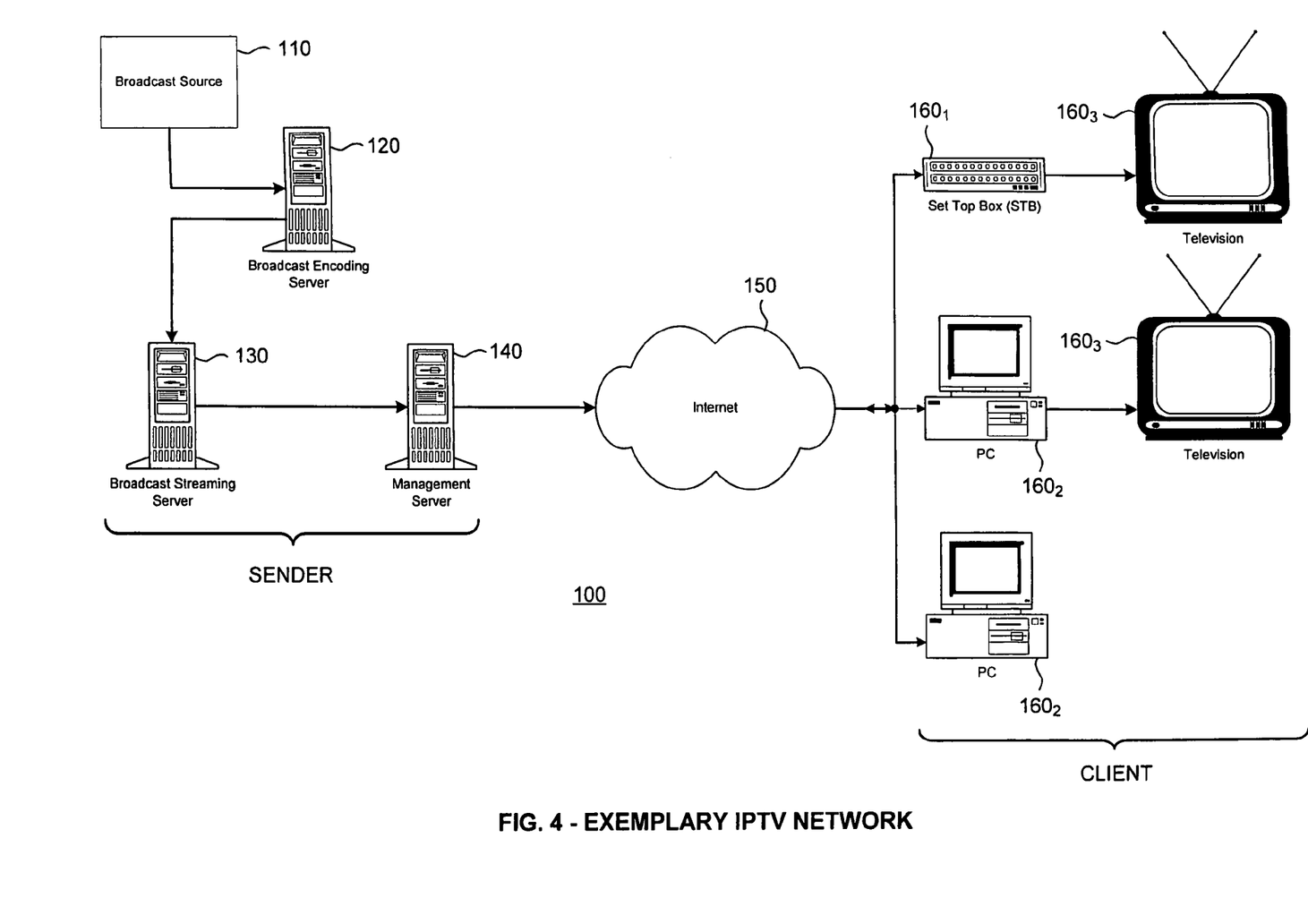
FIG. 4 is an exemplary IPTV network in accordance with an embodiment of the invention.

FIG. 4 illustrates an exemplary IPTV network 100 in accordance with one embodiment of the invention. A broadcasting source 110 is a live feed from a broadcaster, such as a satellite, a commercial cable network, or an on-air television station. A broadcast encoder server 120 inputs either the analog television signal or high bit-rate digital stream from the broadcasting source 110, and outputs a digital video and audio stream that is compressed and formatted for delivery over the network 100. Broadcast streaming server 130 is a media server that hosts a number of encoded broadcast streams for a large number of clients 160 (such as a set-top-box $160_1$, computers $160_2$ and/or televisions $160_3$). In one embodiment, the time zone of the broadcasting source 110 is hours ahead of the time zone of the clients such as eight or more hours for example.

As shown in FIG. 4, the broadcast streaming server 130 can deliver multicast, unicast, or point-to-point (P2P) streams, and typically comprises multiple servers configured as a server farm to provide fault tolerance. In a unicast environment, the server farm is usually required to manage connections to numerous clients. In one embodiment, a management server 140 typically integrates customer activity and provides customer services, such as an electronic program guide (EPG) and billing.

Communications over the Internet 150 are done through a) 1-to-1 communication scheme or Unicast, b) 1-to-N communication schemes, such as multicast or broadcast, or c) Peer-to-Peer communication scheme.

Figure 5:
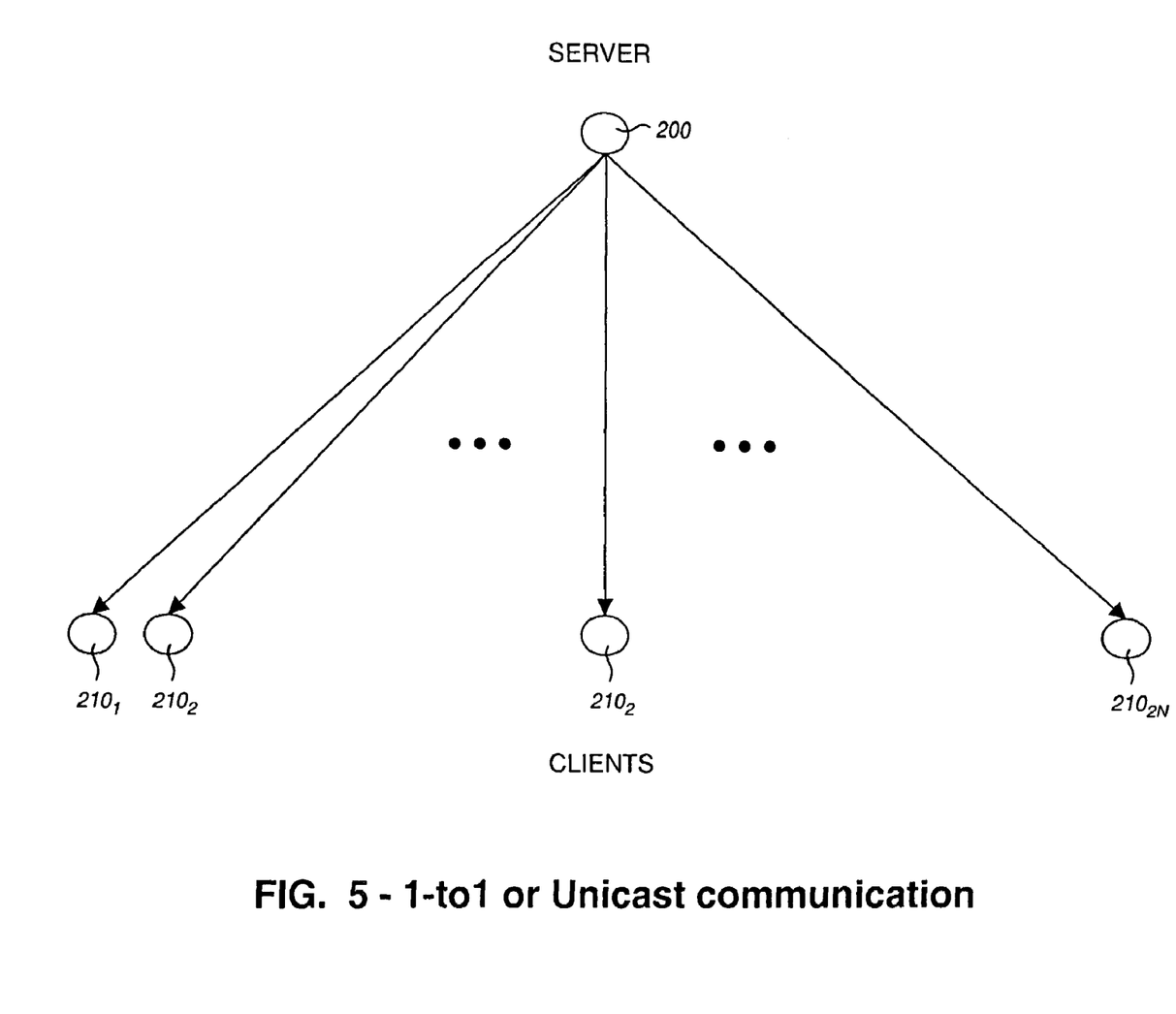
FIG. 5 is an exemplary embodiment of a 1-to-1 communication scheme in accordance with an embodiment of the invention.

FIG. 5 shows a 1-to-1 communication scheme or Unicast in accordance with one embodiment of the present. Unicast is the communication between a single sender and a single receiver over a network. Normally, traffic congestion will occur at sender (or server) 200 when it communicates to multiple (N≧1) receivers (or clients) $210_1$-$210_N$ at the same time. The bandwidth requirement for server 200 is substantially proportional to the peak number (N) of its clients $210_1$-$210_N$ that are concurrently in communication with server 200. Doubling the number (2N) of clients $210_1$-$210_N$ will typically mean doubling the bandwidth requirement of server 200.

Figures 1, 6:
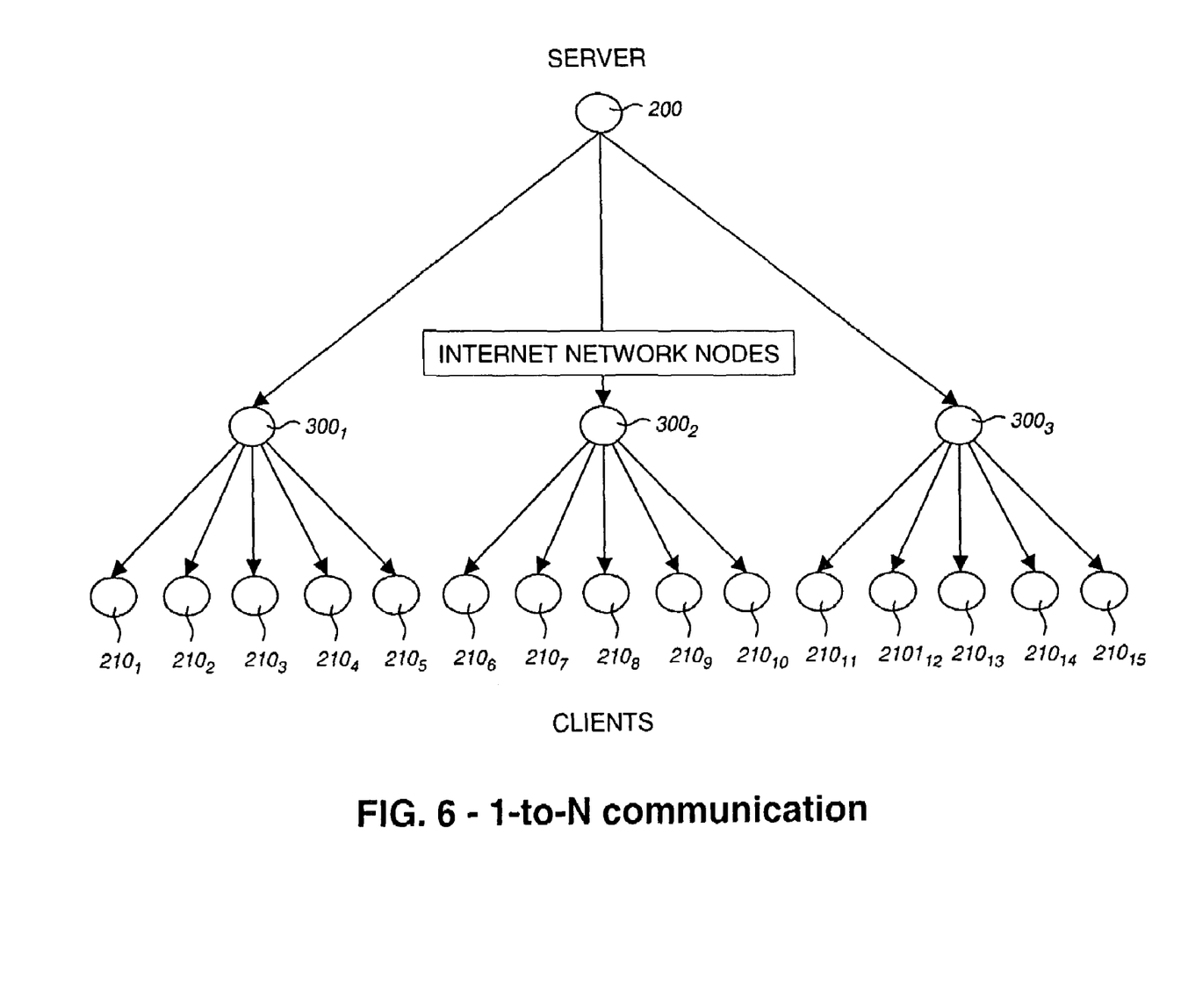
FIG. 6 is an exemplary embodiment of a 1-to-N communication scheme in accordance with an embodiment of the invention.

FIG. 6 illustrates an exemplary 1-to-N communication scheme such as Multicast, Broadcast and Data Caching in accordance with one embodiment of the present invention.

As stated above, Multicast and Broadcast are merely examples of a 1-to-N communication scheme as shown where server 200 routes multicast data transmissions to intermediary nodes $300_1$-$300_3$ over the Internet. Each intermediary node $300_1$, $300_2$ or $300_3$ subsequently routes the data transmission to multiple groupings of clients $210_1$-$210_5$, $210_6$-$210_{10}$ and $210_{11}$-$210_{15}$, respectively. The difference between Multicast and Broadcast communication scheme is that Multicast is delivered to only specific clients that request the data while Broadcast is delivered to all clients. Clients that do not want the data stream will simply ignore it.

More broadly construed, 1-to-N communications covers any available technology, such as Data Caching, where the same data is duplicated or stored on network between source and destination and can be delivered to a new destination that requested the same data. The 1-to-n communication scheme is designed to reduce bandwidth loading on the network.

Figure 7:
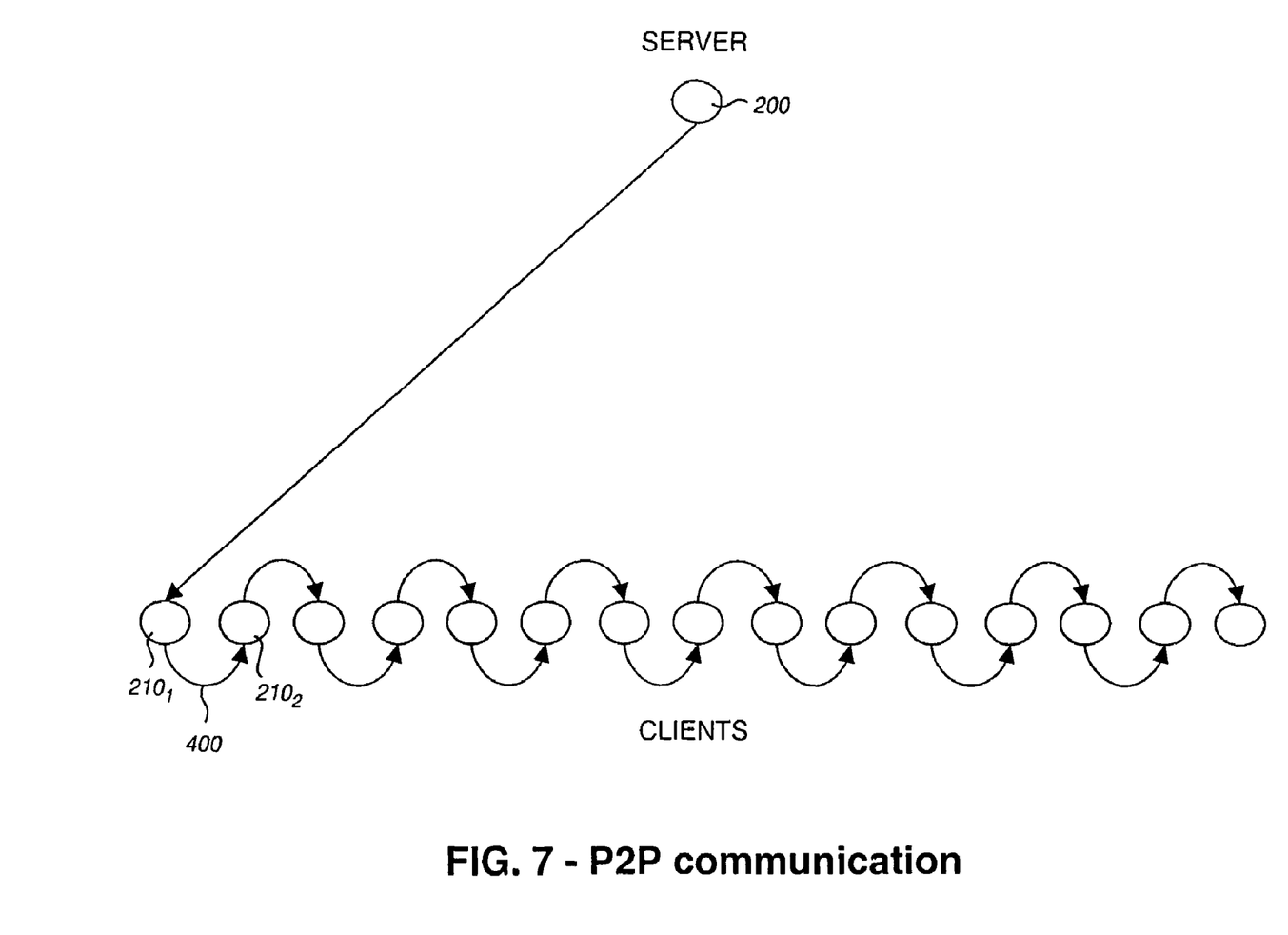
FIG. 7 is an exemplary embodiment of a Peer-to-Peer (P2P) communication scheme in accordance with an embodiment of the invention.

FIG. 7 illustrates an exemplary Peer-to-Peer (P2P) communication scheme in accordance with one embodiment of the present invention. P2P is a technology where one client $210_1$ forwards a video data stream 400 originally transmitted from server 200 to the next client $210_2$ who is watching the same program.

Each of the above-described communication schemes or networks or transmission technologies has their own advantages and disadvantages. The 1-to-1 communication scheme requires larger bandwidth at the server to service large number of clients. The 1-to-N communication schemes require that every intermediary Internet network node has intelligence and resources to save and duplicate the data stream to be delivered other destinations. Furthermore, Internet Service Providers (ISP) may reserve this feature to premium customers. 1-to-N networks are likely to be scattered and separated in a smaller groups. The P2P communication scheme can only be as fast as the slowest client. Generally, the uplink or transmitting data rate of a client is much less than its downlink or receiving data rate. This ration can be in an order of 1 to 10. Therefore, P2P's bitrate or bandwidth can be 10 times less than in 1-to-1 and 1-to-N.

In one embodiment, a client's network is tested for 1-to-N communication scheme. If one of them is available and cost effective, it will be used to deliver video to the client. The 1-to-N provides the most cost effective video quality. The large bandwidth requirement in 1-to-1 makes it the most cost ineffective. If 1-to-N is not possible, the P2P is chosen to deliver the video. The invention improves P2P's bitrate or video quality by taking advantage of the difference in time zones and removes redundant video content such as commercial.

In one embodiment, the invention takes advantage of the difference in time zones to improve quality of video. For example, the video transmitted from a source whose time zone is ahead of the destination's time zone can use the time difference to transmit a video segment with higher bit rate and/or resolution. For example, a 30-minute news segment broadcasted at 8:00 p.m. EST in New York can be transmitted in 3 hours to a viewer in Los Angeles who wants to see the program at 8:00 p.m. (PST) since 8:00 p.m. (PST) in Los Angeles is 3 hours after 8:00 p.m. (EST) in New York. With 3-hours to transmit the 30-minute video segment, the segment can be transmitted with a bit rate that is up to 6 times higher than the bit rate used in the original broadcast of the video segment. As the difference in time zone gets larger, such as 14 hours between time zones of some South East Asia countries and the United States, it is possible to transmit video segments with even larger bit rate and/or resolution. In short, this solution is suitable to transmit video content or segment to a destination in a time zone that lags the time zone of a source where the video content or segment is originally broadcasted, such that the time length of the video segment or content being transmitted is less than the time difference between the destination and the source.

In one embodiment, in order to maximize video quality for each client while minimizing the bandwidth cost at the transmitting server, the communication scheme to perform the video transmission is selected based on the client's viewing category and communication capability (e.g., P2P or 1-to-N). A client, or "viewer," is grouped in one of two viewer categories, the Specific Content Viewer category and the Channel Surfing (or Browsing) Viewer category, based on whether the viewer has specified or selected pre-scheduled the viewing content. For example, weekly video programs are good examples of pre-scheduled viewing content. After the viewer is familiar with the weekly programming, he or she will specify or select pre-scheduled programs to be delivered weekly. After the viewer specifies or selects pre-scheduled programs, this information can be used to deliver the specified or selected video program prior to the viewing time using slower bandwidth using P2P or 1-to-N communication schemes, depending on which communication schemes the viewer or client can support.

In contrast, a viewer in the Channel Surfing (or Browsing) Viewer category generally looks for a show or something to watch. Live video and audio streams need to be delivered to these viewers immediately as they likely switch from channel to channel searching for programming content to view. The video program delivered is instantaneous and therefore, its bitrate or quality will be low.

According to one embodiment of the invention, the two viewer categories, Specific Content and Channel Surfing are further divided into different Network Technology Groups, including One-to-Many (or 1-to-N) and Peer-To-Peer (or P2P)

In one embodiment, the invention takes advantage of the following facts to deliver video programming content with minimum transmission bandwidth of the server:

1. The time difference between the leading time zone of the broadcasting source and the lagging time zone of the clients—this difference gives additional time for the delivery of video and audio programming content to the clients.
2. Viewers typically know what programs they want to watch ahead of time and usually do not watch programs or shows 24 hours a day. Thus, viewers can select which programs that they want to watch ahead of time so that programs will be ready on time and/or can be watch at the later time.

In order to reduce peak bandwidth on the server, the invention specifies the method to deliver only the needed programming contents ahead of the actual broadcast time at lower bandwidth or bit rate speed. As such, the invention allows a server to transmit video and audio streams to a higher number of clients.

For the Specific Program Viewer category, the server has more time to deliver selected programming contents that clients specified in advance because the server is in a time zone that is ahead of its clients' time zone. The method of delivering can be P2P, 1-to-N communications, or a combination of P2P and 1-to-N communications. In addition to having more time for delivery, the contents can also be limited to small size.

Figure 8:
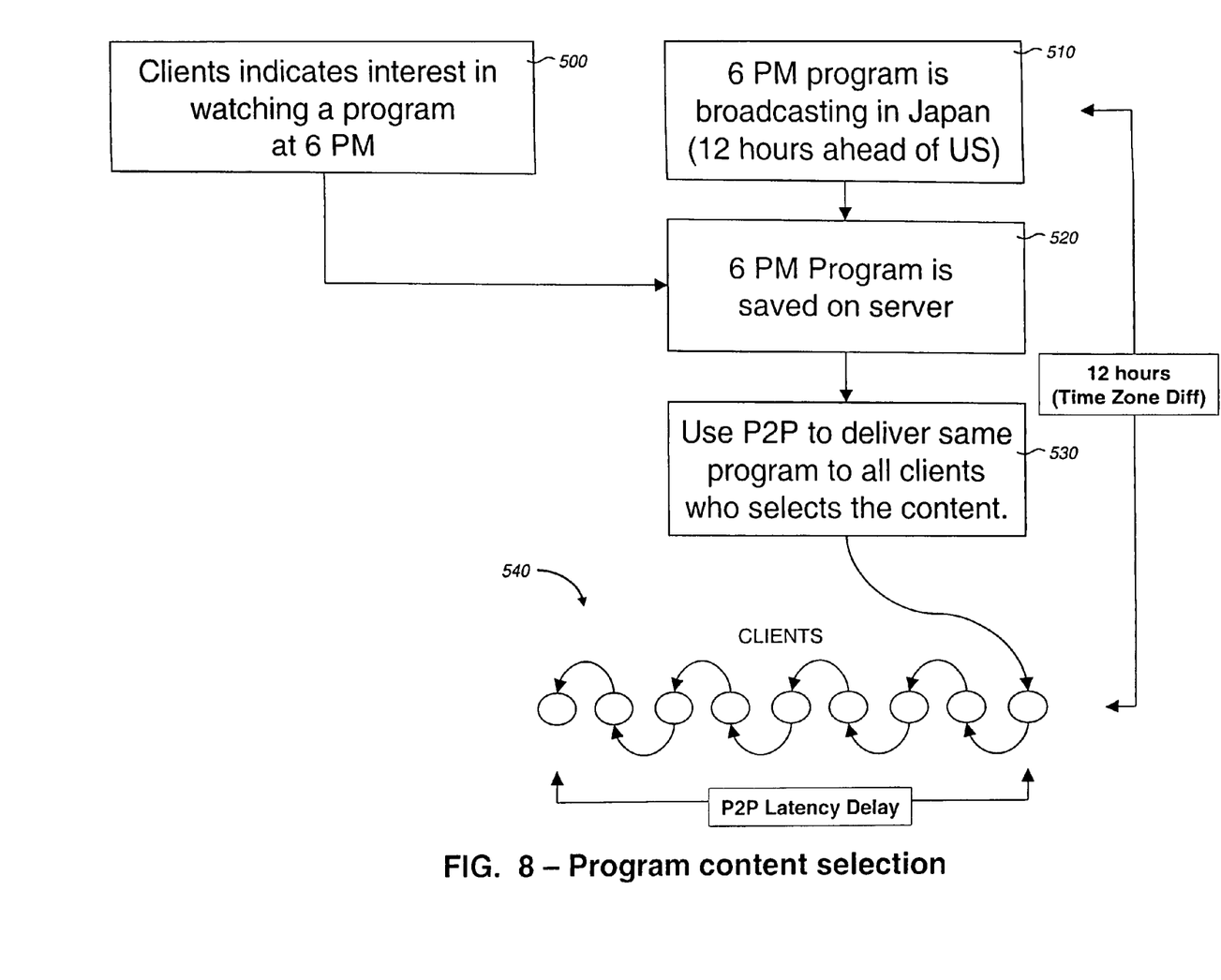
FIG. 8 is an exemplary application in accordance with an embodiment of the invention.

FIG. 8 illustrates an exemplary application of the invention where clients in the United States can select to pre-deliver a 6-PM-television program of a TV station in Japan where the time zone difference is approximately 12 hours (blocks 500 and 510). In this case, there is only 1 hour of video stream to be delivered within 12 hours. For this illustrative embodiment, the television program is saved on a server (block 520), and undergoes a P2P communication scheme to deliver the stored television program to all clients selecting the content (block 530). As mentioned above, these clients are in time lagging time zones to the broadcasting source.

In accordance with communication scheme described above, the pre-delivery bandwidth (PBW) may be computed as follows:

$$PBW=(NBW)*(Playing\ Time)/((Playing\ Time)+(Time\ Zone\ Delay)),$$

where:
Normal Bandwidth "NBW" is the normal transmission/resolution data rate.
"Time Zone Delay" is the time difference between the broadcasting source (server) and the clients.
"Playing Time" is the duration of the elapsed playing time of a program.

Figure 9:
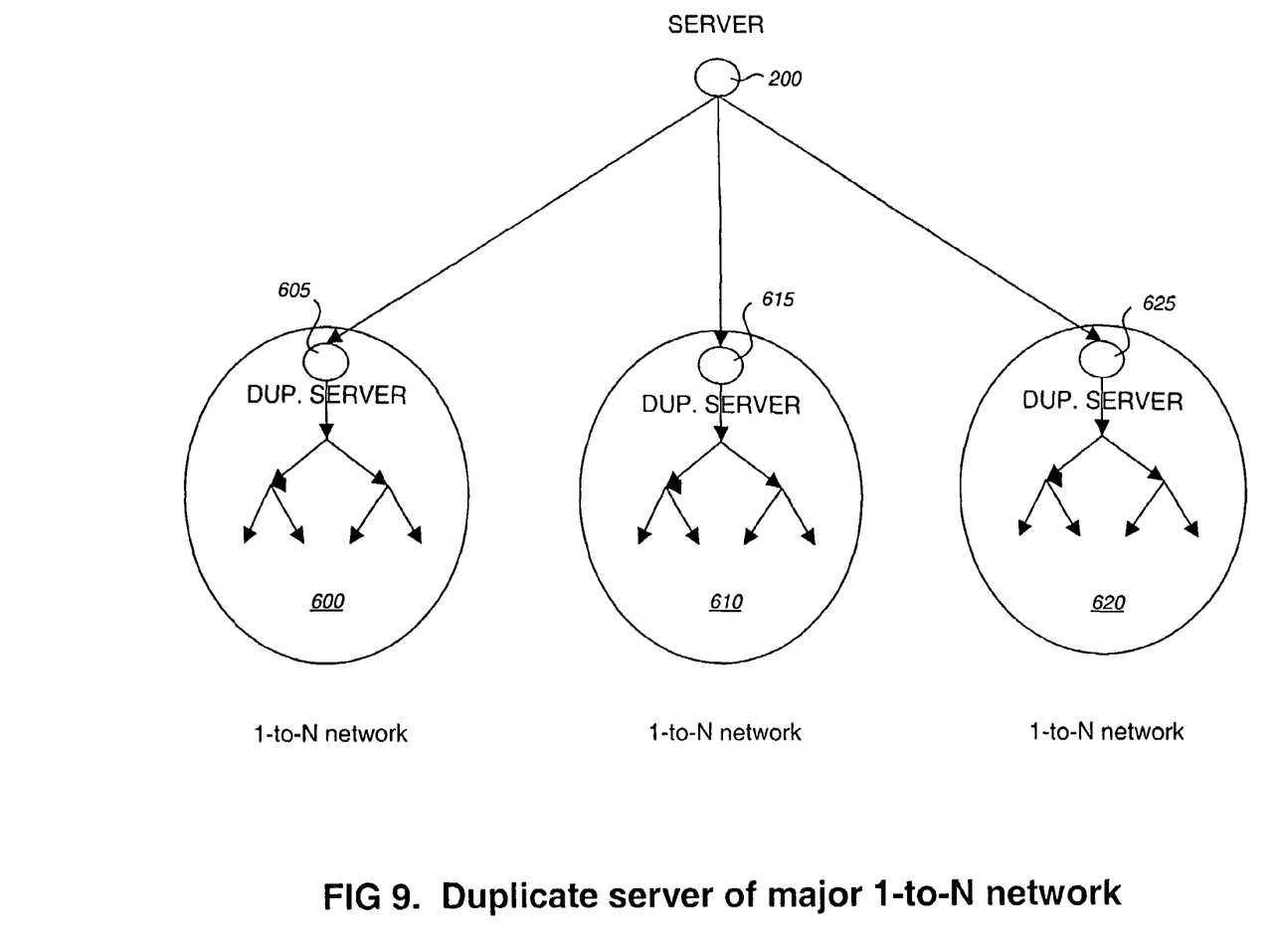
FIG. 9 is an exemplary embodiment of a 1-to-N communication scheme using duplicate servers in accordance with an embodiment of the invention.

For Channel Surfing Viewer category, the invention solves the above problem with 1-to-N communication technology by duplicating servers of the 1-to-N groups. FIG. 9 illustrates an exemplary placement of duplicate (or repeater) servers 605, 615 and 625 for each 1-to-N network group 600, 610 and 620 respectively.

In one embodiment, the invention uses P2P to transmit video and audio streams to clients outside 1-to-N Network Group. Clients (viewers) are separated into groups based upon their transmission's speed. Fast clients will be received higher resolution (data rate) video stream, while slow clients will receive lower resolution video stream.

Figure 10:
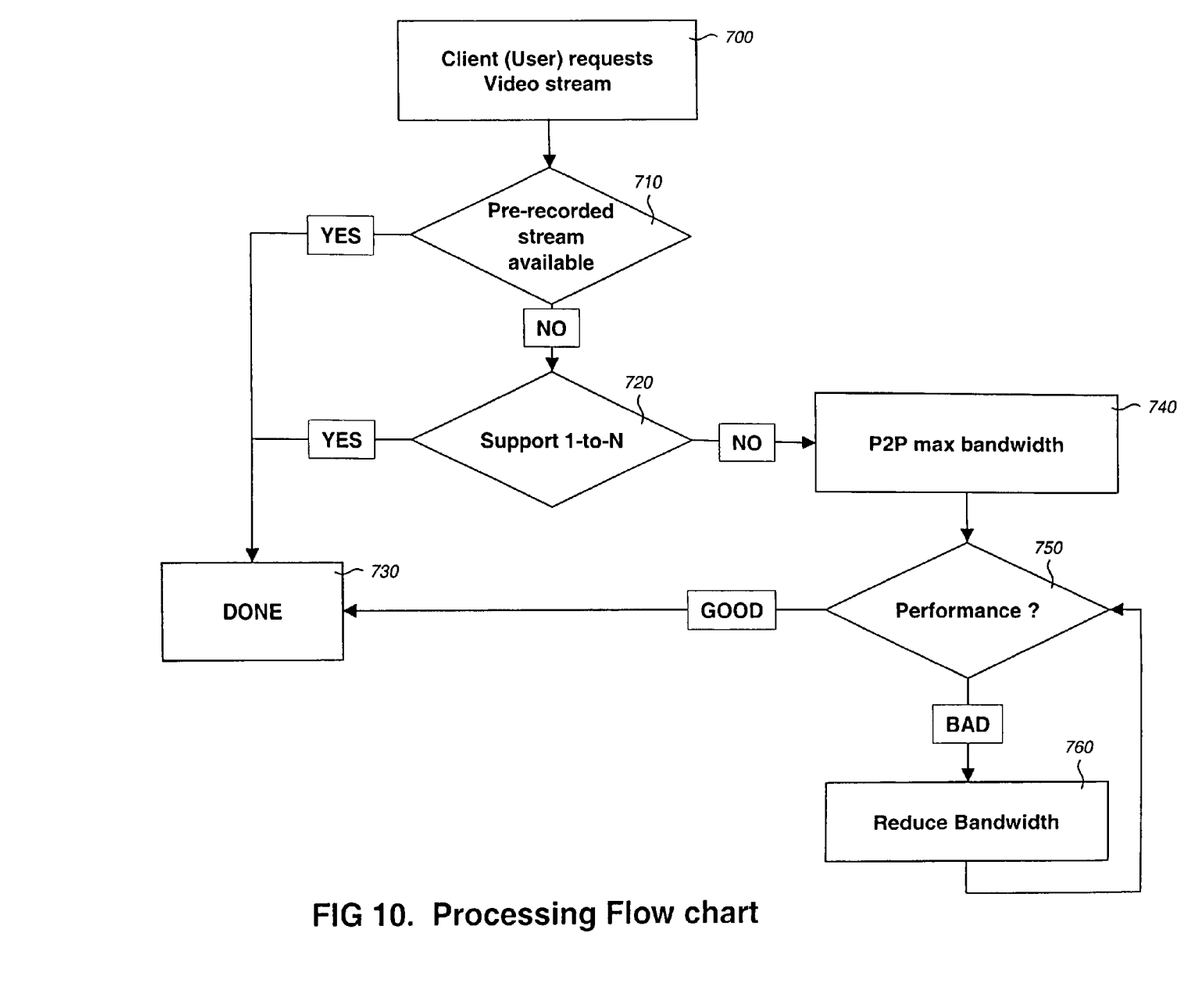
FIG. 10 is an exemplary flow chart outlining the processing operations in accordance with an embodiment of the invention.

FIG. 10 illustrates an exemplary flow chart outlining the processing operations in accordance with one embodiment of the present invention. Where the client requests a video stream and a pre-recorded stream is unavailable (blocks 700 & 710), the client is queried to see whether it could support a 1-to-N communication network (block 720). If the client could support a 1-to-N communication network, it will receive the highest resolution (data rate) video stream and the processing operations are completed (block 730).

However, if the client could not support a 1-to-N communication network, the client is queried to see whether it could support a P2P network with high transmission rate (blocks 740 & 750). If the client could not support a P2P network with high transmission rate, a P2P network with a lower transmission rate will be selected and utilized to transmit video and audio streams (or programming contents) to the client (block 760).

Although the present invention has been described with respect to specific examples and subsystems, it will be apparent to those of ordinary skill in the art that the invention is not limited to these specific examples or subsystems but extends to other embodiments as well.

What is claimed is:

1. A method comprising:
   determining a time zone delay for a program transmitted over the Internet between a broadcasting source in a first time zone and a targeted destination in a second time zone, the first time zone being different than and leading the second time zone so that a local time at the first time zone is ahead of a corresponding local time at the second time zone; and
   transmitting the program to the targeted destination at a higher resolution than a resolution of the program transmitted within the first time zone, wherein
      the resolution of the program being increased up to a factor computed by (1) a result of the duration of the program added to the time zone delay, divided by (2) the duration of the program, and
      the program being transmitted is not required to reach a destination viewer at the targeted destination until the local time at the second time zone corresponds to the local time at the first time zone when the program was transmitted.

2. The method of claim 1, wherein the program is a video segment.

3. The method of claim 1, wherein the determining of the time zone delay includes (i) determining the first time zone within the broadcasting source is located, (ii) determining a second time zone within the targeted destination is located, and (iii) computing the time zone delay being a time difference between the second time zone and the first time zone.

4. The method of claim 1, wherein the targeted destination is a computer or a device connected to the Internet.

5. The method of claim 1, wherein the targeted destination is a television.

6. The method of claim 1, wherein the resolution of the program transmitted to the targeted destination is further increased by removing either commercials or repetitive video portions from the program.

7. The method of claim 1, wherein resolution of the program transmitted to the targeted destination is further increased by utilizing a partial or full amount of time that a viewer shifts a selected viewing time for the program, the viewer specifies an amount of time shift in advance and before the program is broadcasted in the first time zone.

* * * * *

UNITED STATES PATENT AND TRADEMARK OFFICE
CERTIFICATE OF CORRECTION

PATENT NO. : 7,584,289 B2  Page 1 of 1
APPLICATION NO. : 11/486603
DATED : September 1, 2009
INVENTOR(S) : Art Pharn It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this

Fourteenth Day of September, 2010

David J. Kappos
*Director of the United States Patent and Trademark Office*